US009379372B2

(12) United States Patent
Sasaki et al.

(10) Patent No.: US 9,379,372 B2
(45) Date of Patent: *Jun. 28, 2016

(54) BATTERY AND METHOD OF MANUFACTURING THE SAME

(71) Applicant: GS Yuasa International Ltd., Kyoto (JP)

(72) Inventors: Takeshi Sasaki, Kyoto (JP); Kazuhide Tozuka, Kyoto (JP); Katsuhiko Okamoto, Kyoto (JP); Masakazu Tsutsumi, Kyoto (JP)

(73) Assignee: GS YUASA INTERNATIONAL LTD., Kyoto-shi, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/732,415

(22) Filed: Jun. 5, 2015

(65) Prior Publication Data

US 2015/0270527 A1 Sep. 24, 2015

Related U.S. Application Data

(63) Continuation of application No. 14/254,624, filed on Apr. 16, 2014, now Pat. No. 9,118,051, which is a continuation of application No. 13/087,130, filed on Apr. 14, 2011, now Pat. No. 8,748,034.

(51) Int. Cl.
*H01M 2/06* (2006.01)
*H01M 2/30* (2006.01)
(Continued)

(52) U.S. Cl.
CPC .............. *H01M 2/307* (2013.01); *H01M 2/043* (2013.01); *H01M 2/0473* (2013.01); *H01M 2/06* (2013.01); *H01M 2/26* (2013.01); *H01M 2/263* (2013.01)

(58) Field of Classification Search
CPC ...... H01M 2/30; H01M 2/0217; H01M 2/043; H01M 2/0473; H01M 2/26; H01M 2/307; H01M 2/06; H01M 2/263
See application file for complete search history.

(56) References Cited

U.S. PATENT DOCUMENTS 3,548,264 A 12/1970 Carino et al.
3,680,203 A 8/1972 Braiman et al.
3,686,538 A 8/1972 Webster
(Continued)

FOREIGN PATENT DOCUMENTS

CN 2469557 Y 1/2002
CN 2701082 Y 5/2008
(Continued)

OTHER PUBLICATIONS

U.S. Notice of Allowance dated Apr. 22, 2015 in U.S. Appl. No. 14/254,624.
U.S. Office Action dated Jan. 28, 2015 in U.S. Appl. No. 14/254,624.
U.S. Office Action dated Jul. 2, 2014 in U.S. Appl. No. 14/254,624.
United States Office Action dated Mar. 16, 2015 in U.S. Appl. No. 13/354,193.
Specification (pp. 1-33) and Drawings (Figs. 1-7) of related co-pending U.S. Appl. No. 13/087,146.

(Continued)

*Primary Examiner* — Ula C Ruddock
*Assistant Examiner* — Lisa S Park
(74) *Attorney, Agent, or Firm* — McGinn IP Law Group PLLC

(57) ABSTRACT

A battery includes a battery container containing a power generating element, a lid plate covering a top opening of the battery container, and including a baffling portion, whose upper surface includes at least one of a first projecting portion and a first recessed portion, and an external terminal including a base portion and a second projecting portion that projects upward from the base portion. The base portion is engaged with the baffling portion of the lid plate.

11 Claims, 6 Drawing Sheets

(51) Int. Cl.
*H01M 2/04* (2006.01)
*H01M 2/26* (2006.01)

(56) References Cited

U.S. PATENT DOCUMENTS

| | | |
|---|---|---|
| 4,045,862 A | 9/1977 | Evans et al. |
| 4,074,417 A | 2/1978 | Pearce et al. |
| 5,360,685 A | 11/1994 | Tanaka |
| 5,656,392 A | 8/1997 | Sano et al. |
| 5,665,483 A | 9/1997 | Saito et al. |
| 5,849,431 A | 12/1998 | Kita et al. |
| 6,159,630 A | 12/2000 | Wyser |
| 6,190,798 B1 | 2/2001 | Okada et al. |
| 6,573,000 B1 | 6/2003 | Miyazaki et al. |
| 6,579,640 B1 | 6/2003 | Nagase et al. |
| 6,746,798 B1 | 6/2004 | Hiratsuka et al. |
| 6,838,207 B1 | 1/2005 | Sugita et al. |
| 7,335,442 B2 | 2/2008 | Nakanishi et al. |
| 7,968,228 B2 | 6/2011 | Park et al. |
| 8,748,034 B2 | 6/2014 | Sasaki et al. |
| 2002/0022408 A1 | 2/2002 | Fukuda |
| 2003/0118902 A1 | 6/2003 | Schubert et al. |
| 2004/0023108 A1 | 2/2004 | Nakanishi et al. |
| 2005/0000090 A1 | 1/2005 | Ratte |
| 2006/0003222 A1 | 1/2006 | Mushiga et al. |
| 2006/0051664 A1* | 3/2006 | Tasai ............. H01M 2/266 429/161 |
| 2007/0037053 A1 | 2/2007 | Anantharaman |
| 2008/0131760 A1 | 6/2008 | Yamagami et al. |
| 2008/0220316 A1 | 9/2008 | Berkowitz et al. |
| 2009/0169989 A1 | 7/2009 | Morikawa et al. |
| 2010/0021811 A1 | 1/2010 | Kado et al. |
| 2010/0047686 A1 | 2/2010 | Tsuchiya et al. |
| 2010/0081048 A1 | 4/2010 | Nansaka et al. |
| 2010/0092858 A1 | 4/2010 | Takashiro et al. |
| 2010/0129709 A1 | 5/2010 | Matsubara |
| 2010/0173178 A1 | 7/2010 | Kim et al. |
| 2011/0052977 A1* | 3/2011 | Kurata ............. H01M 2/06 429/179 |
| 2011/0076543 A1* | 3/2011 | Ro ............. H01M 2/0413 429/121 |
| 2011/0076552 A1 | 3/2011 | Taniguchi et al. |
| 2011/0092111 A1 | 4/2011 | Tsuchiya et al. |
| 2011/0159356 A1 | 6/2011 | Tozuka et al. |
| 2011/0300435 A1 | 12/2011 | Byun |
| 2012/0258355 A1 | 10/2012 | Guen |
| 2012/0264001 A1 | 10/2012 | Tsuchiya et al. |
| 2012/0264003 A1 | 10/2012 | Tsuchiya et al. |
| 2012/0264004 A1 | 10/2012 | Tsuchiya et al. |
| 2012/0264005 A1 | 10/2012 | Tsuchiya et al. |
| 2012/0264006 A1 | 10/2012 | Tsuchiya et al. |

FOREIGN PATENT DOCUMENTS

| | | |
|---|---|---|
| CN | 101578723 A | 11/2009 |
| GB | 2 154 049 A | 8/1985 |
| JP | 59-58754 A | 4/1984 |
| JP | 2-54162 | 4/1990 |
| JP | H07-032490 A | 2/1995 |
| JP | 8-321287 A | 12/1996 |
| JP | 10-125291 A | 5/1998 |
| JP | 11-195561 A | 7/1999 |
| JP | 2000-138056 A | 5/2000 |
| JP | 2000-268781 A | 9/2000 |
| JP | 2000-277081 A | 10/2000 |
| JP | 2001-093485 A | 4/2001 |
| JP | 2001-357833 A | 12/2001 |
| JP | 2002-175797 A | 6/2002 |
| JP | 2002-245991 A | 8/2002 |
| JP | 2002-324541 A | 11/2002 |
| JP | 2003-92103 A | 3/2003 |
| JP | 2003-323869 A | 11/2003 |
| JP | 2003-346774 A | 12/2003 |
| JP | 2004-296447 A | 10/2004 |
| JP | 3612629 B2 | 1/2005 |
| JP | 2005-56649 A | 3/2005 |
| JP | 3708183 B2 | 10/2005 |
| JP | 2005-310569 A | 11/2005 |
| JP | 2006-19093 A | 1/2006 |
| JP | 2006-216411 A | 8/2006 |
| JP | 2007-107048 A | 4/2007 |
| JP | 2001-126684 A | 5/2007 |
| JP | 3985805 B2 | 10/2007 |
| JP | 2008-27823 A | 2/2008 |
| JP | 2008-218244 A | 9/2008 |
| JP | 2008-251213 A | 10/2008 |
| JP | 2003-346778 A | 12/2008 |
| JP | 2008-305645 A | 12/2008 |
| JP | 2009-52126 A | 3/2009 |
| JP | 2009-54531 | 3/2009 |
| JP | 2009-181782 A | 8/2009 |
| JP | 2009-224225 A | 10/2009 |
| JP | 2009-259424 A | 11/2009 |
| JP | 2009-259739 A | 11/2009 |
| JP | 2009-277604 A | 11/2009 |
| JP | 2009-289637 A | 12/2009 |
| JP | 2010-40533 A | 2/2010 |
| JP | 2010-97764 A | 4/2010 |
| JP | 2010-97822 A | 4/2010 |
| JP | 2010-157415 A | 7/2010 |
| WO | WO 2008/084883 A2 | 7/2008 |
| WO | WO 2009150917 A | 12/2009 |
| WO | WO 2010001975 A1 | 1/2010 |

OTHER PUBLICATIONS

Specification (pp. 1-37) and Drawings (Figs. 1-9) of related co-pending U.S. Appl. No. 13/354,193.
Specification (pp. 1-31) and Drawings (Figs. 1-7) of related co-pending U.S. Appl. No. 13/336,947.
Specification (pp. 1-35) and Drawings (Figs. 1-7) of related co-pending U.S. Appl. No. 13/316,248.
United States Office Action dated Feb. 10, 2012, in the U.S. Appl. No. 13/316,248.
Extended European Search Report dated Apr. 17, 2012.
Extended European Search Report dated May 7, 2012.
United States Office Action dated Nov. 13, 2012, in the U.S. Appl. No. 13/087,146.
United States Office Action dated Aug. 14, 2013, in the U.S. Appl. No. 13/336,954.
Notice of Allowance dated Jul. 18, 2013 in U.S. Appl. No. 13/336,947.
United States Office Action dated Sep. 27, 2013, in the U.S. Appl. No. 13/316,248.
United States Notice of Allowance dated Jul. 18, 2013 for U.S. Appl. No. 13/336,947.
United States Office Action dated Apr. 10, 2013, in the U.S. Appl. No. 13/087,146.
United States Office Action dated Apr. 10, 2013, in the U.S. Appl. No. 13/087,130.
United States Office Action dated Aug. 14, 2013, in the U.S. Appl. No. 13/087,130.
United States Office Action dated Nov. 13, 2012, in the U.S. Appl. No. 13/087,130.
Notice of Allowance dated Jan. 16, 2014 in U.S. Appl. No. 13/087,130.
Wei Lei et al., "Study on Reinforcing and Toughening of Polyphenylene Sulfide", China Plastics Industry, pp. 19-21, Apr. 2009.
United States Office Action dated Jul. 7, 2015 in U.S. Appl. No. 13/354,193.
US Office Action dated Jan. 5, 2015 in co-pending U.S. Appl. No. 13/354,193.
United States Office Action dated May 9, 2016 in U.S. Appl. No. 13/354,193.

* cited by examiner

BATTERY AND METHOD OF MANUFACTURING THE SAME

The present application is a Continuation application of U.S. patent application Ser. No. 14/254,624, filed on Apr. 16, 2014, which is a Continuation application of U.S. patent application Ser. No. 13/087,130, filed on Apr. 14, 2011, which is based on Japanese Patent Application No. 2008-267737 filed on Oct. 16, 2008, the entire contents of which are hereby incorporated by reference.

BACKGROUND OF THE INVENTION

1. Field of the Invention

The present invention relates to a battery in which a terminal is provided for a lid plate covering a top opening of a battery container containing a power generating element.

2. Description of the Related Art

FIG. 7 shows an attachment structure of a terminal for a conventional large-sized nonaqueous electrolyte secondary battery (see FIG. 6 to FIG. 8 in JP-A-2001-357833, for example). This nonaqueous electrolyte secondary battery is configured such that an elliptic cylindrical winding power generating element 2 is contained within a battery container 1 and a top opening of the battery container 1 is covered and sealed by a lid plate 3. At both right and left ends of the power generating element 2, metallic foils 2a, 2a of electrodes respectively protrude in a wound state. These metallic foils 2a, 2a are connected to current collecting connectors 5, 5. Further, to both right and left ends of the lid plate 3, external terminals 4, 4 are attached.

The external terminal 4 is configured such that a bolt portion 4b is disposed projecting upward from an upper surface of a low and columnar base portion 4a, and a tube 4c is disposed projecting downward from a lower surface of the base portion 4a. Further, the tubes 4c, 4c of the external terminals 4, 4 respectively on a positive electrode side and a negative electrode side are fitted into the battery container 1 over the lid plate 3, respectively through through holes of external insulating and sealing members 6, 6 provided on an upper surface of the lid plate 3 at both right and left ends, terminal pull-out through holes 3a, 3a at the both right and left ends of the lid plate 3, and through holes of internal insulating and sealing members 7, 7 provided on a lower surface of the lid plate 3 at the both right and left ends. The tubes 4c, 4c are also swaged from below respectively through through holes provided in connecting portions 5a, 5a of the current collecting connectors 5, 5 that are bent in a horizontal direction. Therefore, each external terminal 4 is configured such that the tube 4c is connected to the current collecting connector 5 by the caulking, as well as to the metallic foil 2a of the electrode of the power generating element 2, and fixedly attached to the lid plate 3 in an insulated and sealed state as the lid plate 3 is held between the insulating and sealing members 6 and 7.

However, according to such an attachment structure of the external terminal 4, when a pressure-bonded terminal of a lead wire or the like is fitted into the bolt portion 4b of the external terminal 4 and fastened by a nut or the like in order to connect the nonaqueous electrolyte secondary battery to an external device, in particular when such a nut is repeatedly attached and detached, there is a possibility that fastening torque is directly applied to the portion of the tube 4c to make the caulking between the tube 4c and the connecting portion 5a of the current collecting connector 5 loose, and only the external terminal 4 possibly runs idle. The external terminal 4 running idle causes a problem of reduced battery performance due to an increased contact electrical resistance between the external terminal 4 and the current collecting connector 5, as well as a problem of defective sealing within the battery container 1 due to a gap occurring between the insulating and sealing members 6 and 7.

In addition, as aluminum alloy is often used for the external terminal 4 on the positive electrode side in the case of the nonaqueous electrolyte secondary battery, there is another problem that when the bolt portion 4b is tightly fastened by a nut or the like, or when such a nut is repeatedly attached and detached, a thread ridge of the bolt portion 4b is often damaged.

Accordingly, there have conventionally been proposed to provide the base portion 4a of the external terminal 4 in a polygonal columnar shape having a square or hexagonal transverse section, to provide an external terminal recessed portion of a corresponding shape for the external insulating and sealing member 6, and to have the base portion 4a be fitted into the external terminal recessed portion of the external insulating and sealing member 6, thereby baffling the external terminal 4 (see FIG. 1 to FIG. 5 of JP-A-2001-357833, for example).

However, even with such an attachment structure of the external terminal 4, there is a problem that the external terminal 4 possibly runs idle by a small amount of angle due to a small gap in the fitting between the base portion 4a and the external terminal recessed portion of the external insulating and sealing member 6, and it is not possible to completely prevent the caulking between the tube 4c and the connecting portion 5a of the current collecting connector 5 from becoming loose. In addition, there is another problem that when the bolt portion 4b is fastened by a nut or the like, the fastening torque is directly applied to the external insulating and sealing member 6 to apply a significant stress to the external insulating and sealing member 6, and whereby airtightness become impaired.

For this reason, conventionally, an attachment structure of the external terminal 4 as shown in FIG. 8 has also been proposed (see JP-A-2003-346774 (page 2 and FIG. 3), for example). According to the external terminal 4 of this example, the base portion 4a is provided in a hexagonal columnar shape, and the bolt portion 4b is disposed projecting from the upper surface of the base portion 4a, but a tube is not disposed projecting from the lower surface. Further, an external terminal recessed portion 6a of a similarly hexagonal shape is provided in an upper surface of the external insulating and sealing member 6, and the base portion 4a is fitted into the external terminal recessed portion 6a, thereby attempting to baffle the external terminal 4.

The upper surface of the external insulating and sealing member 6 is also provided with an auxiliary terminal recessed portion 6b, into which a base portion 8a of an auxiliary terminal 8 is fitted. The auxiliary terminal 8 is configured such that a first tube 8b is disposed projecting downward from a lower surface of the base portion 8a, and a second tube 8c is disposed projecting upward from an upper surface of the base portion 8a. Further, the first tubes 8b, 8b of the auxiliary terminals 8, 8 of the positive electrode side and the negative electrode side are fitted into the battery container 1 over the lid plate 3, respectively through through holes provided in bottom surfaces of the auxiliary terminal recessed portions 6b, 6b of the external insulating and sealing members 6, 6, the terminal pull-out through holes 3a, 3a at the both right and left ends of the lid plate 3, and the through holes of the internal insulating and sealing members 7, 7. The first tubes 8b, 8b are also swaged from below respectively through through holes provided in the connecting portions 5a, 5a of the current collecting connectors 5, 5. Therefore, each auxiliary terminal 8 is configured such that the first tube 8b is connected to the metallic foil 2a of the power generating element 2 through the connecting portion with the connecting portion 5a of the current collecting connector 5 by the swaging, and fixedly attached to the lid plate 3 in an insulated and sealed state as the lid plate 3 is held between the insulating and sealing members 6 and 7.

Further, a connecting conductor 9 is attached to the second tube 8c of the auxiliary terminal 8 and the bolt portion 4b of the external terminal 4. The connecting conductor 9 is a substantially rectangular plate member, in which a hole 9a is provided in one end, and a terminal through hole 9b is provided in the other end. Further, the connecting conductor 9 is configured such that the bolt portion 4b of the external terminal 4 is inserted into the terminal through hole 9b from below, and the second tube 8c of the auxiliary terminal 8 is inserted into the hole 9a from below, and swaged from above. Therefore, when the bolt portion 4b is fastened by a nut or the like in order to connect to the external device, the external terminal 4 is connected and fixed to the auxiliary terminal 8 through the connecting conductor 9, and thus connected to the metallic foil 2a of the electrode of the power generating element 2.

By using such an attachment structure of the external terminal 4, as the fastening torque is not directly applied to the auxiliary terminal 8 even when the bolt portion 4b is fastened by a nut or the like, the swaging between the auxiliary terminal 8 and the connecting portion 5a of the current collecting connector 5 may not become loose. In addition, even in the case of the nonaqueous electrolyte secondary battery, it is possible to use aluminum alloy only for the auxiliary terminal 8 on the positive electrode side, and iron or steel having high strength can be used for the external terminal 4. Therefore, the thread ridge of the bolt portion 4b may not be damaged due to fastening by a nut or the like.

Conventionally, there is proposed a technique for baffling the external terminal by providing a projecting portion for the base portion of the external terminal, and inserting the projecting portion into a recessed hole of a lid plate portion made of resin (see JP-A-10-125291, for example). However, in this case, the base portion of the external terminal is within the battery container, and the recessed hole is also defined in the lower surface within the lid plate portion. Therefore, it is necessary that the attachment of the external terminal and the insertion of the projecting portion into the recessed hole be carried out within the battery container, posing a problem that the battery assembly is difficult.

However, as a result of a great deal of consideration, there is a problem even in the attachment structure of the external terminal 4 as described above that as the fastening torque is directly applied to the external terminal recessed portion 6a of the external insulating and sealing member 6 when the bolt portion 4b is fastened by a nut or the like, a significant stress is applied by to the external insulating and sealing member 6 that seals between the auxiliary terminal 8 and the lid plate 3 by swaging the first tube 8b of the auxiliary terminal 8, and therefore it is not possible to prevent high level of airtightness from being impaired. Specifically, as the external insulating and sealing member 6 is pressed strongly by the upper surface of the lid plate 3, as well as subjected to a large strength in a twisted direction, slight deformation of the material generates a minor gap in an interface with the lid plate 3 and possibly makes the sealing defective. Further, as the external insulating and sealing member 6 is baffled with respect to the lid plate 3, the external insulating and sealing member 6 itself is possibly displaced slightly due to a slight gap between the baffling and the lid plate 3, and whereby a minor gap is generated in the interface with the lid plate 3 and possibly makes the sealing defective.

SUMMARY OF THE INVENTION

An object of the present invention is to provide a battery capable of baffling an external terminal using a baffling portion disposed projecting on a lid plate, so that fastening torque of the external terminal would not impair airtightness and conductivity, and a method of manufacturing such a battery.

A first aspect of the present invention is a battery that includes: a battery container containing a power generating element; a lid plate covering a top opening of the battery container, and provided with a baffling portion whose upper surface is partially configured in a projecting and/or recessed manner; and an external terminal having a base portion and a projecting portion that projects upward from the base portion, the base portion being disposed on the lid plate so as to be engaged with the baffling portion of the lid plate.

A second aspect of the present invention is a battery that includes: a battery container containing a power generating element; a lid plate covering a top opening of the battery container, and provided with a terminal pull-out through hole that penetrates vertically through the lid plate and a baffling portion whose upper surface is partially configured in a projecting and/or recessed manner; an auxiliary terminal configured such that a lower portion thereof is connected to an electrode of the power generating element by being fitted into the battery container through the terminal pull-out through hole of the lid plate, and sealed and fixed to the lid plate by a sealing material; a connecting conductor configured such that a portion thereof is connected and fixed to an upper portion of the auxiliary terminal, and provided with a terminal connecting portion at a different portion; and an external terminal having a base portion and a projecting portion that projects upward from the base portion, the projecting portion being connected to the terminal connecting portion of the connecting conductor, and the base portion being engaged with the baffling portion of the lid plate.

A third aspect of the present invention is such that, in place of the connecting conductor, the auxiliary terminal is provided with a connecting conductor portion that is pulled out from the upper portion of the auxiliary terminal, and the pulled-out portion is provided with the terminal connecting portion.

A fourth aspect of the present invention is such that the battery is configured as a nonaqueous electrolyte secondary battery, the auxiliary terminal is made of one of aluminum and aluminum alloy on a positive electrode side, the auxiliary terminal is made of one of copper and copper alloy on a negative electrode side, and the external terminal is made of one of iron and steel.

A fifth aspect of the present invention is such that the base portion of the external terminal is provided with a recessed portion facing upward in a bottom surface, a shape defined as the recessed portion being other than a solid of revolution centering an axial line of the projecting portion, and the baffling portion of the lid plate is configured as a projecting portion provided by causing a plate member of the lid plate to project upward by press working in a shape that is fitted into the recessed portion of the base portion, and configured to restrict rotation of the external terminal centering the axial line of the projecting portion by fitting and engaging the projecting portion into and with the recessed portion of the base portion.

A sixth aspect of the present invention is such that the rotation of the external terminal centering the axial line of the projecting portion is restricted by engagement between the base portion of the external terminal and the baffling portion of the lid plate with a terminal insulation member interposed therebetween.

A seventh aspect of the present invention is such that as the terminal insulation member, a terminal insulation layer provided or joined so as to cover at least a surface of the baffling portion on the upper surface of the lid plate is used.

An eighth aspect of the present invention is such that the base portion of the external terminal is engaged with the terminal insulation member instead of the baffling portion of the lid plate, whereby restricting rotation of the external terminal centering the axial line of the projecting portion with respect to the terminal insulation member, and the terminal insulation member is engaged with the baffling portion of the lid plate, and whereby rotation of the terminal insulation member centering the axial line of the projecting portion with respect to the lid plate is restricted.

A ninth aspect of the present invention is such that in place of the projecting portion, the external terminal is provided with a projecting portion having a threaded hole facing downward in an upper end surface of the projecting portion.

A tenth aspect of the present invention is a method of manufacturing a battery, wherein a baffling portion of a lid plate of the battery is provided as a projecting portion projecting upward and having a shape fitting into a recessed portion of a base portion by pressing the lid plate from below using a mold of a projecting shape, in a state in which the base portion of an external terminal is brought into contact with the lid plate.

BRIEF DESCRIPTION OF THE DRAWINGS

The foregoing and other features of the invention will become apparent to one skilled in the art to which the present invention relates upon consideration of the invention with reference to the accompanying drawings, wherein.

DETAILED DESCRIPTION OF THE INVENTION

Figure 5:
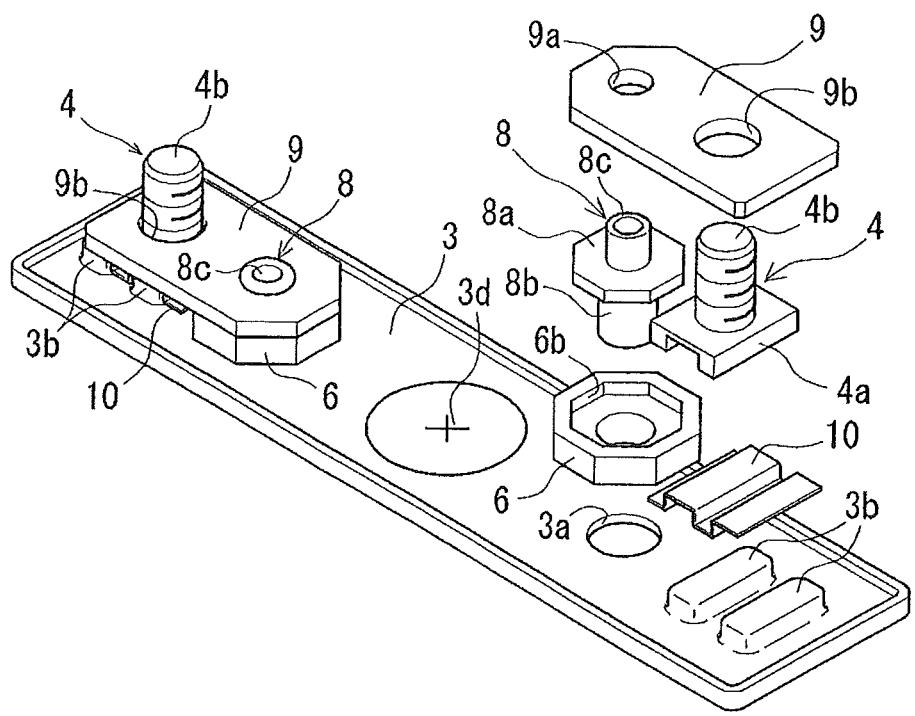
FIG. 5 shows a partially omitted exploded perspective view of a different embodiment of the present invention, in which a base portion and the baffling member of the external terminal are provided with concavity and convexity in a ridged manner.
Figure 6:
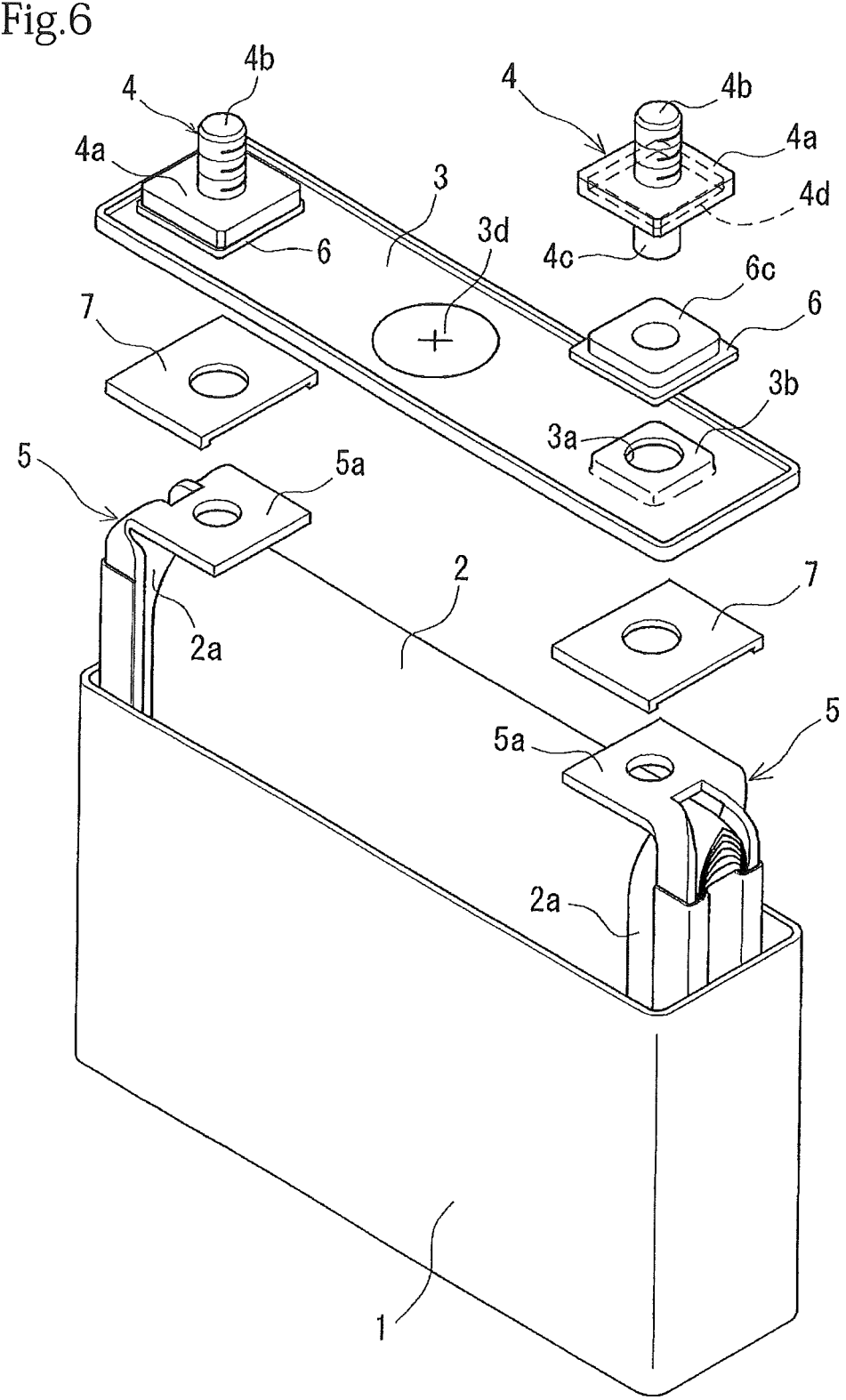
FIG. 6 shows an exploded perspective view of another embodiment of the present invention, illustrating a structure of a nonaqueous electrolyte secondary battery.
Figure 7:
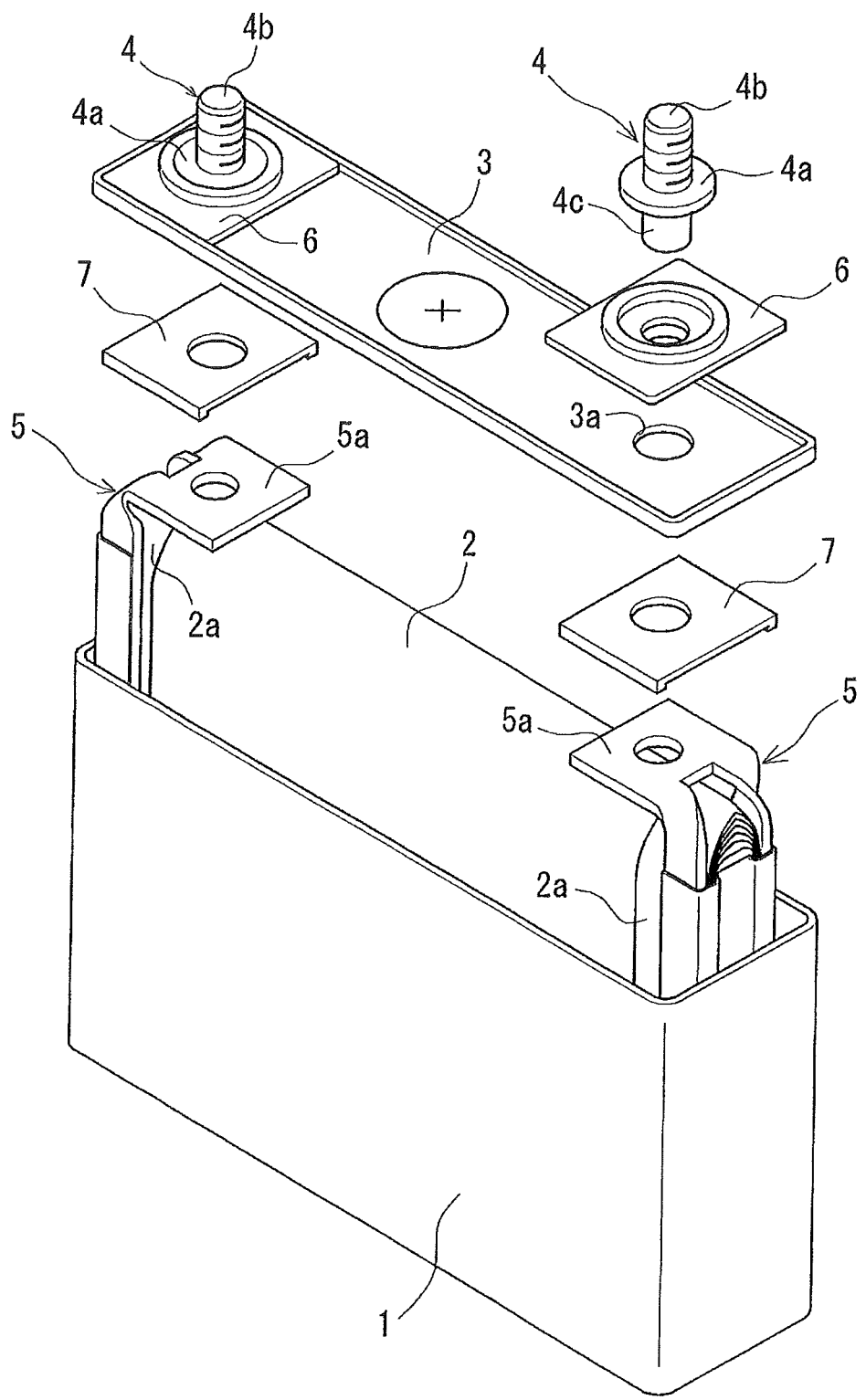
FIG. 7 shows an exploded perspective view of a conventional example, illustrating a structure of a nonaqueous electrolyte secondary battery.
Figure 8:
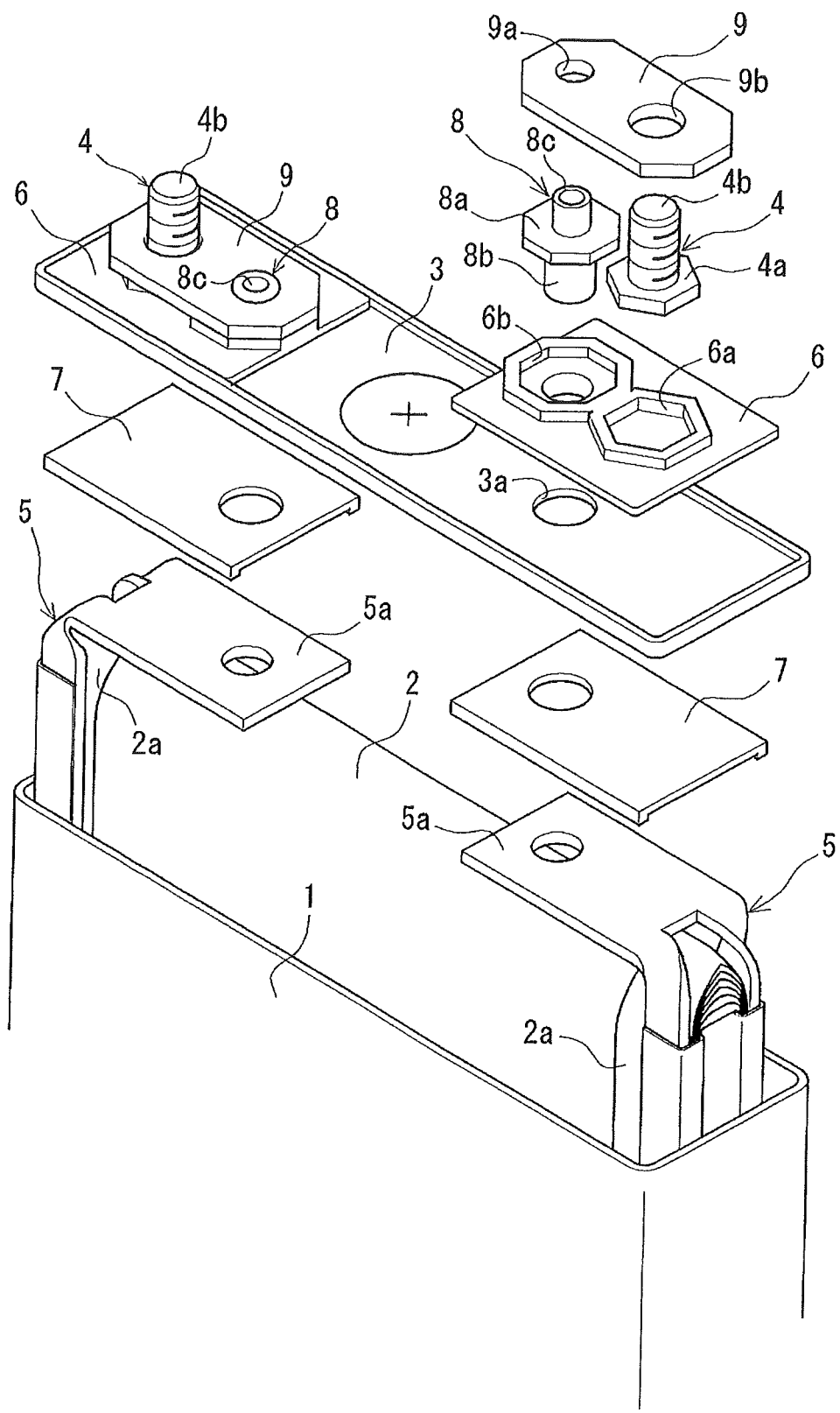
FIG. 8 shows an exploded perspective view of another conventional example, illustrating a structure of a nonaqueous electrolyte secondary battery.

Preferred embodiments of the present invention will be described hereinafter with reference to FIG. 1 to FIG. 6. Throughout the figures, like components having functions as those of the conventional examples illustrated in FIG. 7 and FIG. 8 are denoted by like reference numerals.

Figure 1:
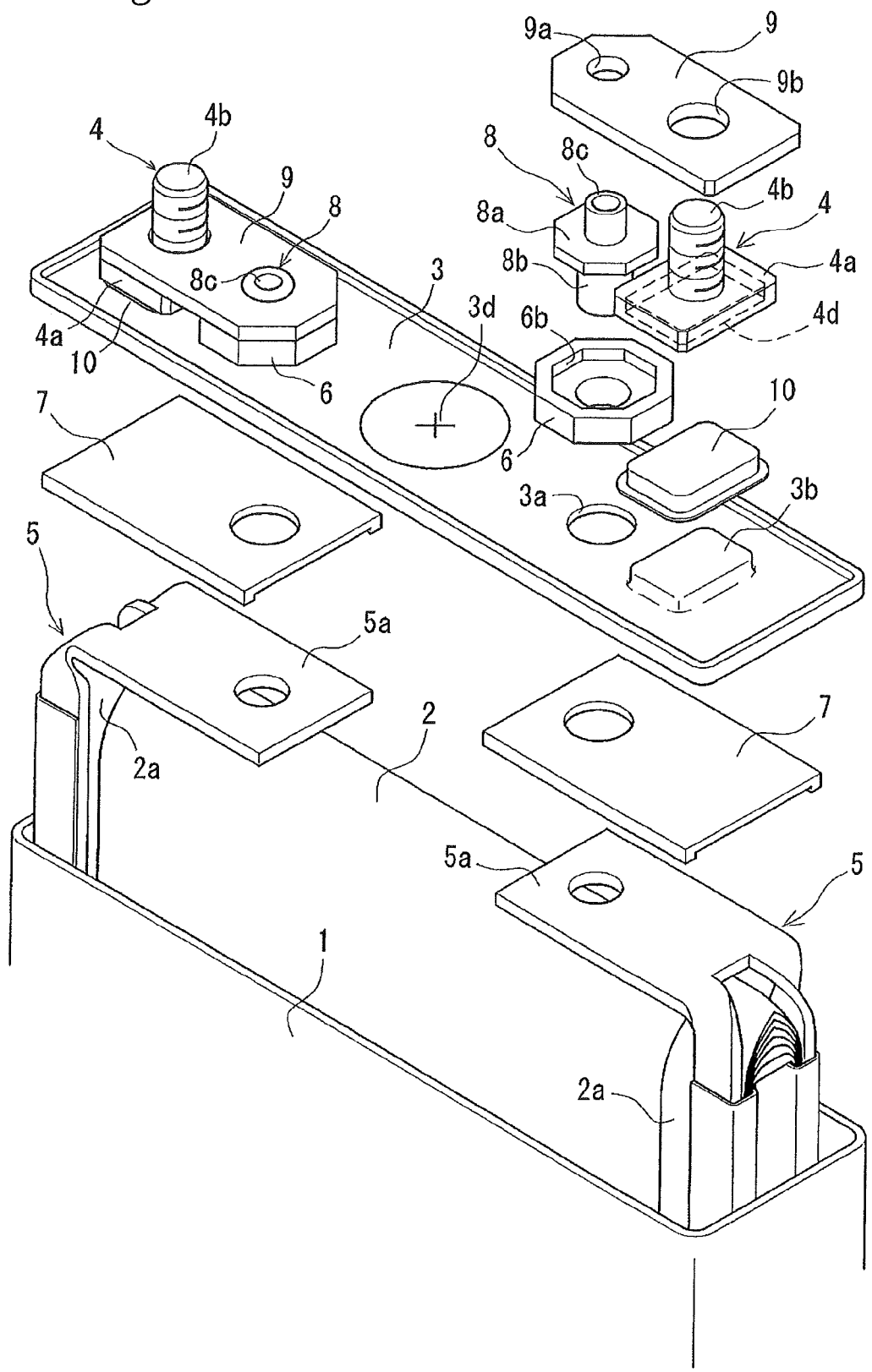
FIG. 1 shows an exploded perspective view of one embodiment of the present invention, illustrating a structure of a nonaqueous electrolyte secondary battery.
Figure 2:
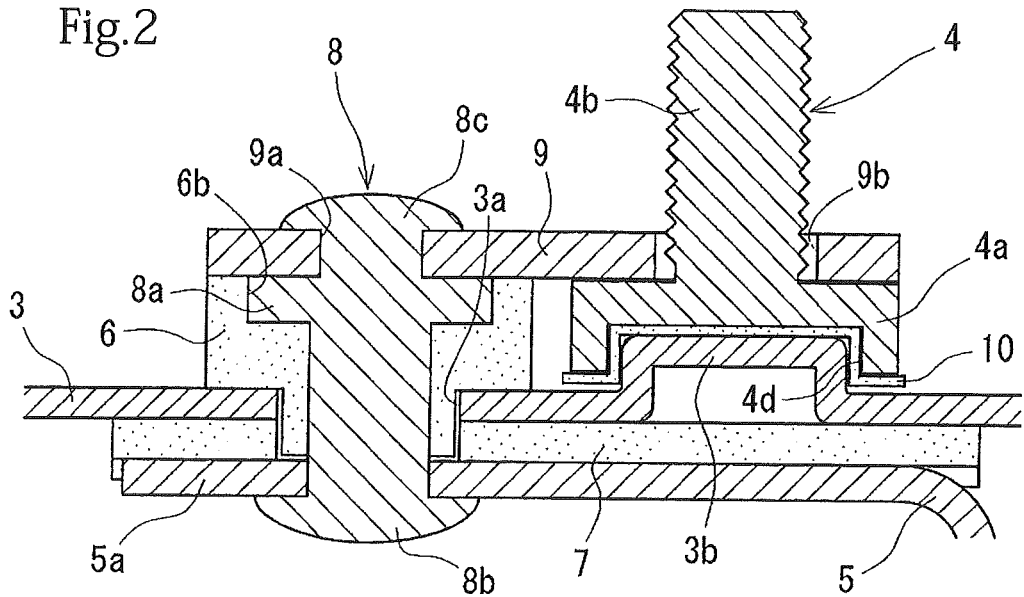
FIG. 2 shows a partially enlarged cross-sectional elevational view of one embodiment of the present invention, illustrating an attachment structure of an external terminal of the nonaqueous electrolyte secondary battery.

This embodiment describes a large-sized nonaqueous electrolyte secondary battery. Referring to FIG. 1 and FIG. 2, the nonaqueous electrolyte secondary battery is configured such that a battery container 1 contains an elliptic cylindrical winding power generating element 2, and sealed by a lid plate 3 covering a top opening of the battery container 1.

The power generating element 2 is configured such that a positive electrode and a negative electrode as belt-shaped electrodes are displaced in different directions of right and left with a separator interposed therebetween and wound centering a rotation axis along a right and left direction in an elliptic cylindrical shape so as to form an ellipse along an up and down direction. The positive electrode is configured such that a positive active material is supported on a surface of an aluminum foil, and the negative electrode is configured such that a negative active material is supported on a surface of a copper foil. The aluminum foil and the copper foil are exposed by making end edge portions thereof respectively in the directions displacing to right and left as portions uncoated by the corresponding active materials. Therefore, from right and left end portions of the power generating element 2, metallic foils 2a, 2a of the electrodes protrude in a wound state.

The metallic foils 2a, 2a that protrude from the right and left end portions of the power generating element 2 are respectively connected to current collecting connectors 5, 5. Each current collecting connector 5 is a vertically elongated conductive metal plate made of aluminum or aluminum alloy on a positive electrode side and made of copper or copper alloy on a negative electrode side. In each current collecting connector 5, an upper portion forms a connecting portion 5a that is bent horizontally and provided with a through hole, and a portion under the connecting portion 5a is divided into two in a back and forth direction and extends downward. Further, the portion under the current collecting connector 5 that is divided into two is sandwiched by a holding plate along with the metallic foil 2a of the power generating element 2, and connected and fixed by ultrasonic welding and the like.

The battery container 1 and the lid plate 3 are made of aluminum alloy, steel, or the like. The battery container 1 is a rectangular metallic container elongated in the right and left direction, and the lid plate 3 is a rectangular metal plate that is narrow and elongated in the right and left direction. Further, the lid plate 3 is later fitted into the top opening of the battery container 1 and seals an interior by laser welding and the like.

The lid plate 3 is provided, in its right and left end portions, with terminal pull-out through holes 3a, 3a (the terminal pull-out through hole 3a on the left side is hidden behind the components, and not shown). At outward sides of the terminal pull-out through holes 3a, 3a in the right and left, baffling portions 3b, 3b are provided (the baffling portion 3b on the left side is hidden behind the components and not shown). The baffling portion 3b is a projecting portion provided by causing a metal plate of the lid plate 3 to project upward in a square shape by press working.

To the terminal pull-out through holes 3a, 3a of the lid plate 3, auxiliary terminals 8, 8 are attached through external insulating and sealing members 6, 6 and internal insulating and sealing members 7, 7. Each auxiliary terminal 8 is a conductive metallic component made of aluminum or aluminum alloy on the positive electrode side and made of copper or copper alloy on the negative electrode side. In each auxiliary terminal 8, a first tube 8b is disposed projecting downward from a lower surface of a base portion 8a in a low and octagonal columnar shape, and a second tube 8c is disposed projecting upward from an upper surface of the base portion 8a.

The external insulating and sealing member 6 and the internal insulating and sealing member 7 are made of synthetic resin having insulating properties and sealing properties. The external insulating and sealing member 6 is provided as an octagonal columnar body that is slightly larger than the base portion 8a of the auxiliary terminal 8, and is provided, on its upper surface, with an auxiliary terminal recessed portion 6b into which the base portion 8a is fitted. Further, the external insulating and sealing member 6 is provided with a through hole in a bottom surface of the auxiliary terminal recessed portion 6b, and an opening in a lower surface of the through hole projects downward in a sleeved manner (see FIG. 2). The internal insulating and sealing member 7 is a plate member provided with a through hole. As a sealing member 6, a square columnar can be used.

The external insulating and sealing member 6 is disposed on the upper surface of the lid plate 3, and its portion projecting in a sleeved manner is fitted into the terminal pull-out through hole 3a. Further, the internal insulating and sealing member 7 is disposed on the lower surface of the lid plate 3, and the portion of the external insulating and sealing member 6 projecting in a sleeved manner downward from the terminal pull-out through hole 3a is fitted into the through hole. Then, the auxiliary terminal 8 is attached to the lid plate 3 by fitting the base portion 8a into the auxiliary terminal recessed portion 6b of the external insulating and sealing member 6, by inserting the first tube 8b into the through hole of the connecting portion 5a of the current collecting connector 5 through the through hole in the bottom surface of the auxiliary terminal recessed portion 6b, the terminal pull-out through hole 3a of the lid plate 3, and the through hole of the internal insulating and sealing member 7, and by swaging a portion that extends downward from the through hole of the connecting portion 5a from below. Therefore, the auxiliary terminal 8 is fixed to the lid plate 3 in an insulated and sealed state, as the auxiliary terminal 8 is connected to the metallic foil 2a of the power generating element 2 through the connecting portion by fixing between the first tube 8b and the connecting portion 5a of the current collecting connector 5, and sandwiches and holds the lid plate 3 with the insulating and sealing members 6 and 7.

Above the baffling portion 3b of the lid plate 3, an external terminal 4 is disposed with a terminal insulation member 10 interposed therebetween. The external terminal 4 is for connecting the nonaqueous electrolyte secondary battery with an external device, and made of iron, steel such as stainless steel or chromium molybdenum steel, or another type of high strength conductive metallic materials. The external terminal 4 is configured such that a bolt portion 4b is disposed projecting upward from an upper surface of a base portion 4a that is a low square column and slightly larger than the projecting portion of the baffling portion 3b of the lid plate 3. Further, a lower surface of the base portion 4a is provided with a baffling recessed portion 4d facing upward, the baffling recessed portion 4d having the same shape as that of and slightly larger than the projecting portion of the baffling portion 3b. The terminal insulation member 10 is configured such that a thin plate made of synthetic resin such as polyphenylene sulfide (PPS) is molded into a low square hat shape, and a square projecting portion on an upper surface is fitted into the baffling recessed portion 4d of the external terminal 4, and a square recessed portion of a lower surface is fitted with the baffling portion 3b of the lid plate 3. Then, the external terminal 4 is placed on the baffling portion 3b such that the projecting portion on the upper surface of the terminal insulation member 10 in which the baffling portion 3b of the lid plate 3 is fitted into the recessed portion in the lower surface of the terminal insulation member 10 is covered by the baffling recessed portion 4d in the base portion 4a. Therefore, the external terminal 4 is insulated from the lid plate 3, as the baffling portion 3b is fitted into the baffling recessed portion 4d in the base portion 4a with the terminal insulation member 10 interposed therebetween, and the lower surface of the base portion 4a is placed on the hat-shaped edge portion of the terminal insulation member 10. Alternatively, in a case in which the terminal insulation member 10 is not provided with the hat-shaped edge portion, it is possible to insulate the external terminal 4 from the lid plate 3 by making the lower surface of the base portion 4a to be lifted from the upper surface of the lid plate 3 when the baffling portion 3b is fitted into the baffling recessed portion 4d in the base portion 4a of the external terminal 4 with the terminal insulation member 10 interposed therebetween.

To the second tube 8c of the auxiliary terminal 8 and the bolt portion 4b of the external terminal 4, a connecting conductor 9 is attached. The connecting conductor 9 is a substantially rectangular plate member made of a conductive metallic material such as copper alloy, and its surface is nickel plated in order to make the surface smooth in addition to a purpose of corrosion prevention. One end portion of the connecting conductor 9 is provided with a hole 9a, and the other end portion of the connecting conductor 9 is provided with a terminal through hole 9b. Further, the connecting conductor 9 is secured from above, by inserting the bolt portion 4b of the external terminal 4 into the terminal through hole 9b from below, and inserting the second tube 8c of the auxiliary terminal 8 into the hole 9a from below. Therefore, while the connecting conductor 9 is connected and fixed to the auxiliary terminal 8, the external terminal 4 only has the bolt portion 4b be fitted into the terminal through hole 9b. Here, in order to reliably fix the flat connecting conductor 9 to the auxiliary terminal 8 by swaging, it is preferable that the upper surface of the base portion 8a of the auxiliary terminal 8 be flush with or slightly higher than the upper surface of the base portion 4a of the external terminal 4 placed on the baffling portion 3b of the lid plate 3 with the terminal insulation member 10 interposed therebetween. However, the upper surface of the base portion 4a should not be too low, as it is not possible for the baffling portion 3b to baffle the external terminal 4 if the fitting between the baffling recessed portion 4d, the terminal insulation member 10, and the baffling portion 3b is disengaged when the external terminal 4 is lifted and the upper surface of the base portion 4a is brought into contact with the lower surface of the connecting conductor 9.

According to the external terminal 4 of the nonaqueous electrolyte secondary battery having the above structure, a pressure-bonded terminal of a lead wire of the external device, which is not illustrated, for example, is fitted into the bolt portion 4b and screwed by a nut. Then, the external terminal 4 is usually slightly lifted to press the upper surface of the base portion 4a against the lower surface of the connecting conductor 9, and sandwiches and presses the connecting conductor 9 along with the pressure-bonded terminal of the lead wire between the external terminal 4 and the nut, thereby connecting the pressure-bonded terminal, the external terminal 4, and the connecting conductor 9. Therefore, the pressure-bonded terminal of the lead wire is connected to the electrode of the power generating element 2 (the metallic foil 2a) through the connecting conductor 9, the auxiliary terminal 8, and the current collecting connector 5, and whereby the external device is connected to the nonaqueous electrolyte secondary battery.

In addition, the external terminal 4 that tends to rotate when fastening the nut to the bolt portion 4b is reliably baffled by the baffling portion 3b of the lid plate 3 that is fitted into the baffling recessed portion 4d with the terminal insulation member 10 interposed therebetween. At this time, even if the external terminal 4 runs idle by an angle to some extent due to a small gap in the fitting between the baffling portion 3b, the terminal insulation member 10, and the baffling recessed portion 4d, this may not result in any problem in the connection and the sealing.

Further, fastening torque applied to the bolt portion 4b at this time is not transmitted as torque to the auxiliary terminal 8 provided separately from the external terminal 4. Accordingly, there is no possibility that the auxiliary terminal 8 runs idle to make the caulking with the connecting portion 5a of the current collecting connector 5 loose or to impair the connection, or that the sealing between the insulating and sealing members 6 and 7 and the lid plate 3 is impaired. Here, the fastening torque by the nut also generates a force so as to rotate the connecting conductor 9 centering an axial line of the bolt portion 4b. However, such a force presses the second tube 8c of the auxiliary terminal 8 in the back and forth direction, and does not impair the connection or the sealing. In particular, according to this embodiment, as the connecting conductor 9 is nickel plated to make its surface smooth, the fastening by the nut hardly generates a force that can rotate the connecting conductor 9.

Moreover, the terminal insulation member 10 fitted with the baffling portion 3b of the lid plate 3 baffles the external terminal 4 when fastened by the nut, thus receives large fastening torque. However, as the terminal insulation member 10 is separated from the external insulating and sealing member 6 on the lid plate 3, the fastening torque is not applied to the external insulating and sealing member 6 that seals the auxiliary terminal 8. Accordingly, there is no possibility that the sealing by the external insulating and sealing member 6 is impaired.

Furthermore, the fastening torque by the nut is applied only to the external terminal 4 made of a high strength conductive metallic material such as iron or steel, and not to the auxiliary terminal 8 on the positive electrode side made of aluminum or aluminum alloy having poor strength nor to the auxiliary terminal 8 on the negative electrode side made of copper or copper alloy having relatively poor strength. Accordingly, even if the nut is strongly fastened or repeatedly attached and detached, there is no possibility that the thread ridge of the bolt portion 4b is damaged.

Further, as the baffling portion 3b of the lid plate 3 is configured by causing the metal plate of the lid plate 3 to project in a projecting manner by press working, the baffling portion 3b of the lid plate 3 can be easily provided along with the terminal pull-out through hole 3a and the like in a monolithic manner when press working to manufacture the lid plate 3. In the case of this embodiment, an opening for a safety valve 3d in a central portion on the both and left sides of the lid plate 3 illustrated in FIG. 1 can also be provided in a monolithic manner. In addition, it is necessary to provide the external insulating and sealing member 6 of different shapes for batteries of different sizes and having the lid plate 3 of different sizes in the case of the conventional examples illustrated in FIG. 7 and FIG. 8, as the external insulating and sealing member 6 is required to have the shape that is right fit with the edge of the lid plate 3 in order to baffle the external insulating and sealing member 6. However, in the case of this embodiment, even for the batteries having the lid plate 3 of different sizes, it is possible to commonly use the external terminal 4, the terminal insulation member 10, the connecting conductor 9, the auxiliary terminal 8, and the external insulating and sealing member 6 of the same structure as long as the shapes and the sizes of the baffling portion 3b are the same, and whereby it is possible to standardize the terminal structure.

Here, although the above embodiment describes the example in which the baffling portion 3b is provided by causing the metal plate of the lid plate 3 to project upward by press working so as to provide the projecting portion, the baffling portion 3b can also be provided by pressing the lid plate 3 by a mold of a projecting shape from below in a state in which the base portion 4a whose bottom surface is provided with a recessed portion of the external terminal 4 is brought into contact with the lid plate 3, and causing the metal plate of the lid plate 3 to project upward in a shape that is fitted into the recessed portion in the base portion 4a to provide a projecting portion. When simply press working the metal plate of the lid plate 3, a mold of a recessed shape is placed on the upper surface of the lid plate and the lid plate is pressed by the mold of a projecting shape from below, however, providing the recessed portion for the base portion 4a eliminates the necessity for the mold of a recessed shape, and the cost and labor for manufacturing the molds can be reduced. In addition, as the projecting portion is molded by gauge fitting with the recessed portion of the base portion 4a, the baffling portion 3b is precisely fitted with the recessed portion of the base portion 4a. Therefore, it is possible to reliably baffle the external terminal 4 without increasing working accuracy of the press working more than required. Moreover, such a method of providing the baffling portion 3b can be carried out when the terminal insulation member 10 or a terminal insulation layer is interposed between the base portion 4a and the baffling portion 3b.

Further, the above embodiment describes the example in which the external terminal 4 is baffled by fitting the baffling portion 3b provided by projecting the metal plate of the lid plate 3 in a square shape into the baffling recessed portion 4d in the base portion 4a with the terminal insulation member 10 interposed therebetween. However, the base portion 4a and the baffling portion 3b may take any shape as long as the rotation of the external terminal 4 centering the axial line of the bolt portion 4b can be restricted by the engagement of the base portion 4a with the baffling portion 3b with the terminal insulation member 10 interposed therebetween, the baffling portion 3b being provided by making the upper surface of the metal plate of the lid plate 3 partially in a projecting manner or a recessed manner, or in a concave and convex manner, in which the projection and the recess are combined. In addition, the terminal insulation member 10 can be provided in a shape that corresponds to a portion of engagement between the base portion 4a and the baffling portion 3b.

Figure 3:
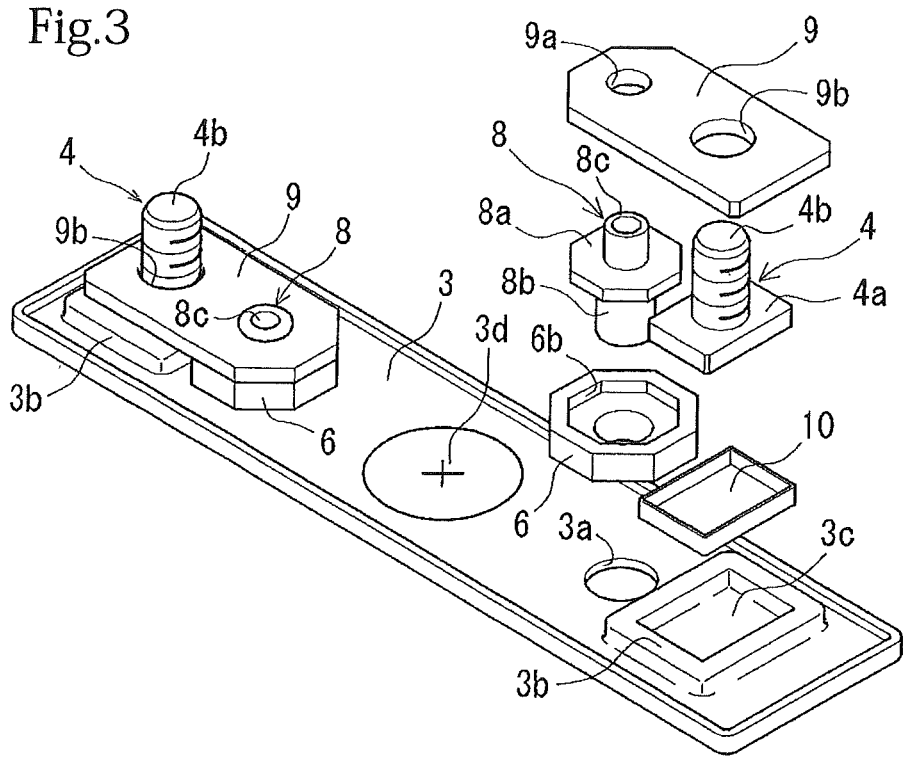
FIG. 3 shows a partially omitted exploded perspective view of a different embodiment of the present invention, illustrating a case in which a baffling member is framed shape.

FIG. 3 shows an example in which the base portion 4a of the external terminal 4 is in a square columnar shape, and the baffling portion 3b is the projecting portion in a frame shape that surrounds the base portion 4a. In this case, also, the external terminal 4 can be baffled by fitting the base portion 4a into a baffling recessed portion 3c surrounded by the frame-shaped baffling portion 3b with the terminal insulation member 10 interposed therebetween. In a case in which the baffling portion 3b and the base portion 4a are baffled by fitting a columnar body into a recessed portion as shown in FIG. 1 and FIG. 3, the columnar body and the recessed portion may take any transverse-sectional shape as long as it is not a solid of revolution centering the axial line of the bolt portion 4b, and any polygonal columnar shape other than a square columnar shape may be used.

Figure 4:
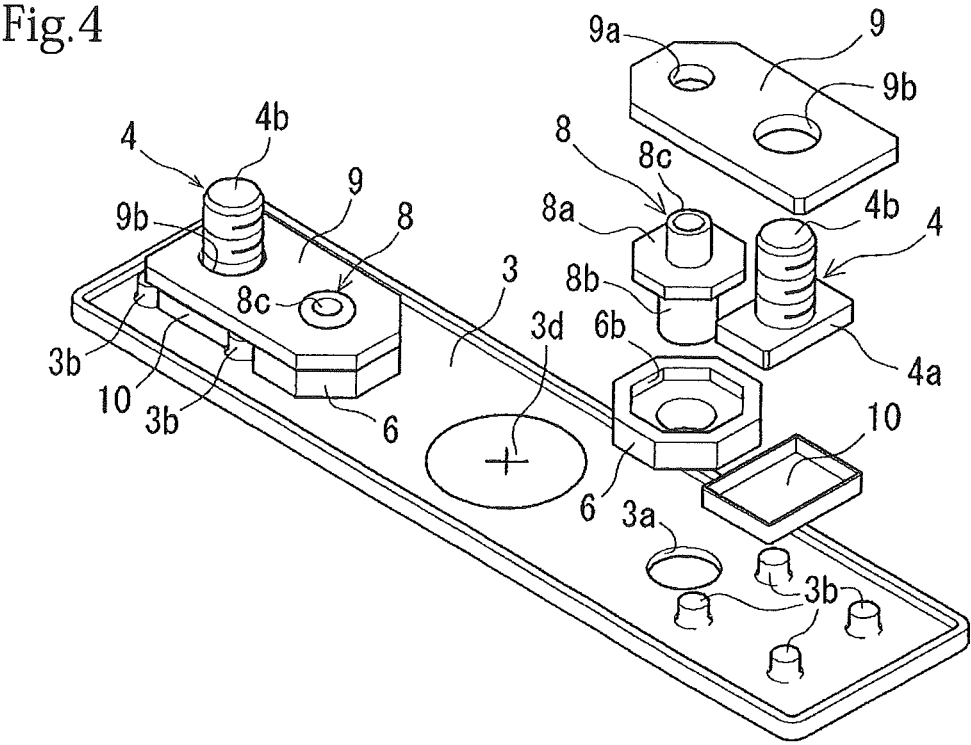
FIG. 4 shows a partially omitted exploded perspective view of a different embodiment of the present invention, illustrating a case in which the baffling recessed portion of the baffling member is configured as four small cylindrical projecting portions.

Moreover, FIG. 4 shows an example in which the base portion 4a of the external terminal 4 is configured in a square columnar shape and the baffling portion 3b is configured as four small cylindrical projecting portions provided by causing the metal plate of the lid plate 3 to project upward. The four projecting portions of the baffling portion 3b in this case are respectively provided at positions near four corners of the frame-shaped baffling portion 3b illustrated in FIG. 3. In this case, also, as the base portion 4a is fitted into between the projecting portions of the baffling portion 3b on the right and the left that are arranged back and forth by two with the terminal insulation member 10 interposed therebetween to restrict the rotation, it is possible to baffle the external terminal 4. In addition, FIG. 5 shows an example in which the lower surface of the base portion 4a is provided with concavity and convexity in a ridged manner, and the baffling portion 3b is configured as a plurality of lines of projecting portions provided by causing the metal plate of the lid plate 3 to project in a ridged manner. In this case, also, the concavity and convexity in a ridged manner of the base portion 4a and the projecting portion in a ridged manner of the baffling portion 3b are meshed with each other with the terminal insulation member 10 in a corrugated plate interposed therebetween, and whereby it is possible to baffle the external terminal 4.

Furthermore, FIG. 3 shows the example in which the baffling portion 3b is configured as the frame shaped projecting portion, and the baffling recessed portion 3c is provided within the portion surrounded by the baffling portion 3b. However, it is possible to provide the baffling portion 3b by causing the upper surface of the metal plate of the lid plate 3 to be recessed. The base portion 4a of the external terminal 4 and the terminal insulation member 10 in this case may take the same shape as illustrated in FIG. 3, or can be altered appropriately according to the shape of the recessed portion of the baffling portion 3b. In addition, although FIG. 5 shows the example in which the baffling portion 3b provided by causing the metal plate of the lid plate 3 to project in a ridged manner, the baffling portion 3b can be configured by providing the metal plate with concavity and convexity in a corrugated plate. In this case, also, the base portion 4a of the external terminal 4 and the terminal insulation member 10 may take the same shape as illustrated in FIG. 5, or may be altered appropriately according to the shape of the concavity and convexity of the baffling portion 3b.

Further, the above embodiment describes the example of using the terminal insulation member 10 in which the thin plate made of synthetic resin is molded in the shape that corresponds to the portion of engagement between the base portion 4a and the baffling portion 3b. However, the terminal insulation member 10 may be configured by molding the synthetic resin into a predetermined shape by injection molding, or can be made of any material such as ceramics in place of synthetic resin as long as it has insulating properties and strength of a certain degree or more. In addition, the terminal insulation member 10 can be made of a flexible synthetic resin sheet or the like that deforms along the shape that corresponds to the portion of engagement between the base portion 4a and the baffling portion 3b.

Moreover, the terminal insulation member 10 may be configured so as to be engaged with the base portion 4a of the external terminal 4, and to be engaged with the baffling portion 3b of the lid plate 3. Specifically, for example, the terminal insulation member 10 can be configured as a block made of synthetic resin, and such that the upper surface is provided with a projecting portion, a recessed portion, or the like with which the base portion 4a is engaged, and that the lower surface is provided with a projecting portion, a recessed portion, or the like engaged with the baffling portion 3b. However, for example, when there are a projecting portion and a recessed portion of the same shape provided for the upper surface and the lower surface of the terminal insulation member 10, a difference from the terminal insulation member 10 becomes unclear.

Furthermore, in place of the terminal insulation member 10 as described above, it is possible to use a terminal insulation layer that covers at least a surface of the baffling portion 3b on the upper surface of the lid plate 3. As the terminal insulation layer, it is possible to use a synthetic resin layer that is injection-molded on the surface of the baffling portion 3b, or a synthetic resin layer, a ceramic layer, or the like that is provided by coating calcination or deposition, or the terminal insulation layer may be a layer such as a synthetic resin film that is joined to the surface of the baffling portion 3b by heat sealing or adhesion.

Further, in the above description, there is described the example in which the terminal insulation member 10 or the terminal insulation layer is used in order to insulate the external terminal 4 from the lid plate 3. However, when it is not necessary to consider the insulation of the external terminal 4 such as in a case in which the external terminal 4 can be conductive to the lid plate 3, the base portion 4a of the external terminal 4 may be directly engaged with the baffling portion 3b of the lid plate 3 without using the terminal insulation member 10 or the terminal insulation layer.

Furthermore, while the above embodiment describes that the current collecting connector 5 and the auxiliary terminal 8 are made of aluminum or aluminum alloy on the positive electrode side, and made of copper or copper alloy on the negative electrode side, any material may be used as long as the material is a conductive metallic material that is appropriate for the type of the battery. In addition, while the above embodiment also shows the examples of the material of the external terminal 4 and the connecting conductor 9, any material may be used as long as the material is a conductive metallic material having suitable properties of strength and conductivity.

Further, the above embodiment describes the example in which the bolt portion 4b is disposed projecting from the upper surface of the base portion 4a of the external terminal 4. However, it is also practicable to provide a projecting portion having an appropriate shape such as a cylindrical or polygonal tubular shape projecting upward, in place of the bolt portion 4b, and to define a threaded hole in an upper end surface of the projecting portion.

Moreover, the above embodiment describes the example in which the second tube 8c of the auxiliary terminal 8 is connected and fixed by swaging through the hole 9a of the connecting conductor 9. However, any method for connecting and fixing the auxiliary terminal 8 to the connecting conductor 9 may be used, and it is possible to connect and fix the one end portion of the connecting conductor 9 to the upper surface of the base portion 8a of the auxiliary terminal 8 by welding and the like.

Furthermore, the component provided in the other end portion of the connecting conductor 9 is not limited to the terminal through hole 9b through which the bolt portion of the external terminal 4 is inserted from below and connected, and may be any terminal connecting portion to which the bolt portion 4b is connected, for example, such as a cut-out groove. In addition, the connecting conductor 9 is not required to be in a plated shape, as long as the terminal connecting portion is provided at the other end portion. Further, the portion at which the connecting conductor 9 is connected and fixed to the auxiliary terminal 8 is not limited to the one end portion, and may be any portion as long as it is a part of the connecting conductor 9, and the terminal connecting portion may be provided at any portion as long as it is a portion other than the portion to be connected and fixed to the auxiliary terminal 8.

Further, the above embodiment describes the example in which the connecting conductor 9 is used. However, a connecting conductor portion that is pulled out from the upper portion of the auxiliary terminal 8 and configured such that the terminal connecting portion is provided at the pulled-out portion may be used in place of the connecting conductor 9. In this case, as the connecting conductor portion is integral with the auxiliary terminal 8, the connecting conductor 9 is not necessary and a number of the components can be reduced, and the fixing with the connecting conductor 9 is not necessary and the number of assembly steps can also be reduced.

Moreover, the above embodiment describes the example in which the auxiliary terminal 8 and the electrode of the power generating element 2 are connected through the current collecting connector 5. However, any connection structure between the auxiliary terminal 8 and the electrode may be employed, and a current collecting connector different from that used in the above embodiment may be used, or other method may be employed for the connection. In addition, the power generating element 2 is not limited to the elliptic cylindrical winding structure, and may have a different shape, such as a stacked type.

Furthermore, the above embodiment describes the example in which the base portion 8a of the auxiliary terminal 8 and the external insulating and sealing member 6 are in an octagonal columnar shape. However, the base portion 8a and the external insulating and sealing member 6 may take any shape, and the external insulating and sealing member 6 is not necessarily required to be provided with the auxiliary terminal recessed portion 6b. In addition, the above embodiment describes the example in which the auxiliary terminal 8 is configured such that the first tube 8b is disposed projecting from the lower surface of the base portion 8a. However, the base portion 8a and the first tube 8b are not necessarily required as long as the upper portion is disposed on the lid plate 3 and the lower portion is fitted into the battery container 1 through the terminal pull-out through hole 3a. In particular, the first tube 8b can be modified to have any structure according to the connection structure between the auxiliary terminal 8 and the electrode.

Further, the above embodiment describes the example in which the external insulating and sealing member 6 and the internal insulating and sealing member 7 are used as the sealing material. However, any sealing material may be used as long as it seals between the auxiliary terminal 8 and the lid plate 3. For example, as the fastening torque is not applied to the auxiliary terminal 8, the auxiliary terminal 8 may be sealed and fixed to the lid plate 3 by a hermetic seal, or a sheet-type or adhesive-type sealing material can also be used.

Moreover, the above embodiment describes the example in which the external terminal 4 and the auxiliary terminal 8 are provided as separate components. However, the auxiliary terminal 8 and the connecting conductor 9 are not necessarily required by using the external terminal 4 also as the auxiliary terminal 8 as illustrated in FIG. 6. Specifically, the nonaqueous electrolyte secondary battery illustrated in FIG. 6 is configured such that a tube 4c of the external terminal 4 is fitted into the battery container 1 in place of the first tube 8b of the auxiliary terminal 8 and secured to the connecting portion 5a of the current collecting connector 5. Then, in the baffling portion 3b configured as the projecting portion projecting upward in a square shape of the lid plate 3, the terminal pull-out through hole 3a opens in a central portion of this projecting portion. In addition, as the external insulating and sealing member 6 also serves as the terminal insulation member 10, the upper surface thereof is provided with a square projecting portion that is fitted into the baffling recessed portion 4d of the external terminal 4, the lower surface thereof is provided with an engagement portion 6c having a square recessed portion that is fitted with the baffling portion 3b of the lid plate 3, and a primary through hole of the external insulating and sealing member 6 is provided in a central portion of the engagement portion 6c.

Also in the case of the nonaqueous electrolyte secondary battery illustrated in FIG. 6, the external terminal 4 which tends to rotate when fastening a nut to the bolt portion 4b is reliably baffled by the baffling portion 3b of the lid plate 3 that is fitted into the baffling recessed portion 4d with the external insulating and sealing member 6 interposed therebetween. In addition, the baffling portion of the lid plate can be easily provided along with the terminal pull-out through hole 3a and the safety valve 3d in a monolithic manner in the press working of the lid plate, and it is possible to standardize the terminal structure of the batteries of different sizes. Then, also in this case, the baffling portion 3b, the external insulating and sealing member 6, and the external terminal 4 may take any shape similarly to the case as described above, and other configurations can be altered appropriately similarly to the case as described above.

Moreover, the above embodiment describes the example in which the battery container 1 and the lid plate 3 are made of aluminum alloy, steel, or the like. However, any material may be used for the battery container 1 and the lid plate 3, and it is possible to use a material other than metal, for example, a material having insulating properties. In addition, the shape and the structure of the battery container 1 and the lid plate 3 are not limited to the above embodiment, and may have any shape and structure.

Furthermore, the above embodiment describes the large-sized nonaqueous electrolyte secondary battery. However, the battery may be of any type and any size (capacity). Among a variety of batteries, the present invention can be suitably applied in particular to a sealed battery requiring high airtightness.

According to a first aspect of the invention, it is possible to restrict the rotation of the external terminal by the baffling portion of the lid plate even if the fastening torque is applied to the projecting portion of the external terminal. Further, as the baffling portion of the lid plate is configured to be projecting or recessed by causing the upper surface of the lid plate partially to project upward or recess downward, it is possible to reliably baffle the external terminal, and a separate components for baffling is not required. Therefore, it is possible to reduce the numbers of assembly steps and components. In addition, the baffling portion can be provided in a monolithic manner when press working the lid plate, for example, and it is possible to standardize the terminal structure of the batteries of different sizes if the shapes and the sizes of the baffling portion are the same. Moreover, as it is possible to attach the external terminal to the lid plate from above to make the base portion to be engaged with the baffling portion, the assembly is facilitated.

According to a second aspect of the invention, the external terminal connected to the external device and the auxiliary terminal connected to the electrode of the power generating element within the battery container are provided separately. Therefore, there is no possibility that the fastening torque applied to the projecting portion of the external terminal is applied to the auxiliary terminal, that the sealing of the sealing material between the auxiliary terminal and the lid plate is impaired, or that the connection between the auxiliary terminal and the electrode of the power generating element is impaired. Further, as the fastening torque applied to the projecting portion of the external terminal is not applied to the sealing material between the auxiliary terminal and the lid plate, there is no possibility that a stress is applied to the sealing material to impair the sealing. Moreover, it is possible to restrict the rotation of the external terminal by the baffling portion of the lid plate even if the fastening torque is applied to the projecting portion of the external terminal. In addition, as the baffling portion of the lid plate is configured to be projecting or recessed by causing the metal plate of the lid plate partially to project upward or recess downward, it is possible to reliably baffle the external terminal, and a separate component for baffling is not required. Therefore, it is possible to reduce the numbers of assembly steps and components.

According to a third aspect of the invention, it is possible to reduce the numbers of assembly steps and components for connecting and fixing the one end portion of the connecting conductor to the auxiliary terminal by swaging by providing the connecting conductor portion for the auxiliary terminal.

According to a fourth aspect of the invention, the fastening by a nut or the like for the connection to the external device is realized by the external terminal made of iron or the like having high strength, instead of the auxiliary terminal made of aluminum or the like having poor strength. Therefore, it is possible to prevent the projecting portion of the external terminal and the thread ridge of the threaded hole from being damaged.

According to a fifth aspect of the invention, the baffling portion of the lid plate is fitted into the recessed portion having a shape other than a solid of revolution provided in the base portion of the external terminal. Therefore, the baffling of the external terminal can be ensured.

According to a sixth aspect of the invention, it is possible to insulate between the base portion of the external terminal and the baffling portion of the lid plate, as the base portion of the external terminal and the baffling portion of the lid plate are connected with the terminal insulation member interposed therebetween, and not directly. The terminal insulation member may be a molded synthetic resin that is previously molded according to the shape of the portion of engagement between the base portion and the baffling portion, a ceramic component, or a flexible synthetic resin sheet or the like that deforms along the shape that corresponds to the portion of engagement between the base portion and the baffling portion.

According to a seventh aspect of the invention, it is possible to insulate between the base portion of the external terminal and the baffling portion of the lid plate, as the base portion of the external terminal and the baffling portion of the lid plate are connected with the terminal insulation layer covering the surface of the baffling portion interposed therebetween, and not directly. The terminal insulation layer may be a synthetic resin layer, a ceramic layer, or the like that is provided by coating calcination and the like on the surface of the baffling portion, or may be a layer such as a synthetic resin film that is joined to the surface of the baffling portion by heat sealing and the like.

According to an eighth aspect of the invention, the baffling portion of the lid plate baffles the terminal insulation member, and the terminal insulation member baffles the external terminal. Therefore, the external terminal is baffled by the baffling portion of the lid plate with the terminal insulation member interposed therebetween.

According to a ninth aspect of the invention, the same effect can be obtained when using the external terminal having the threaded hole in place of the projecting portion.

According to a tenth aspect of the invention, as the base portion of the external terminal may be brought into contact with the lid plate and the lid plate may be pressed by a mold of a projecting shape from below, instead of providing a mold of a recessed shape on the upper surface of the lid plate, it is possible to partially omit the molds for press working the lid plate. In addition, as the baffling portion with which the projecting portion is fitted can be provided for the recessed portion in the base portion by gauge fitting, it is possible to reliably baffle the external terminal without increasing working accuracy of the press working more than required.

What is claimed is:
1. A battery, comprising:
a power generating element;
a battery container containing the power generating element;
a lid plate covering a top opening of the battery container, and the lid plate comprising a metal plate and a projecting portion formed on an outer surface of the lid plate; and
an insulating member provided on the lid plate;
wherein the projecting portion projects upward from an upper surface of the lid plate toward the insulating member,
wherein the insulating member fits to the projecting portion of the lid plate, and
wherein the lid plate comprises a concave portion which overlaps with the projecting portion in a projection direction in which the projecting portion projects from the lid plate, the concave portion being recessed on an inner surface of the lid plate.
2. The battery according to claim 1, wherein the battery further comprises an external terminal comprising a base portion and a bolt portion that projects upward from the base portion, and
wherein the insulating member covers the base portion.
3. The battery according to claim 2, wherein the battery further comprises an electrode plate connected to the power generating element, an auxiliary terminal fixed to the lid plate, and a connecting conductor,
wherein the auxiliary terminal comprises an upper portion and a lower portion, the lower portion of the auxiliary terminal is connected to the electrode plate through a first through hole of the lid plate, and
wherein the connecting conductor comprises a second through hole and a third through hole, the upper portion of the auxiliary terminal is fixed to the connecting conductor through the second through hole, and the bolt portion of the external terminal is fixed to the connecting conductor through the third through hole.
4. The battery according to claim 3, wherein the conductor comprising a plate member, a surface of the plate member is covered with nickel.

5. The battery according to claim 2, wherein the battery further comprises an electrode plate connected to the power generating element and an auxiliary terminal fixed to the lid plate, and wherein the auxiliary terminal comprises a terminal connection portion connected to the external terminal, a lower portion is connected to the electrode plate through a first through hole of the lid plate.

6. The battery according to claim 1, wherein the projecting portion of the lid plate is fitted into a recessed portion in a lower surface of the insulating member.

7. The battery according to claim 1, wherein the battery further comprises an internal insulating member provided on a lower surface of the lid plate, and wherein the internal insulating member covers the concave portion.

8. The battery according to claim 1, wherein the projecting portion comprises a plurality of projecting portions.

9. The battery according to claim 8, wherein the plurality of projecting portions is provided separately isolated from each other.

10. The battery according to claim 9, wherein the insulating member comprises:

a first insulating member placed on a first side of the lid plate with respect to a centerline of the metal plate; and a second insulating member placed on a second side of the lid plate with respect to the centerline of the metal plate, and wherein the first insulating member contacts the plurality of projecting portions provide separately isolated from each other.

11. The battery according to claim 1, wherein the lid plate comprises:

a first portion extending in a lateral direction of an extension of the top opening of the battery container;

a second portion extending perpendicular to the lateral direction of the extension of the top opening of the battery container; and a third portion extending, above the second portion, parallel to the lateral direction of the extension of the top opening of the battery container, wherein the concave portion extends between the side walls of the second portion and below the third portion, and wherein the concave portion overlaps with the projecting portion in the projection direction in which the projecting portion projects upward from the lid plate.

* * * * *